(12) United States Patent
Roover et al.

(10) Patent No.: US 7,437,206 B2
(45) Date of Patent: Oct. 14, 2008

(54) CHEMICAL-MECHANICAL PLANARIZATION CONTROLLER

(75) Inventors: Dirk de Roover, Sherwood, OR (US); Abbas Emami-Naeini, Los Altos, CA (US); Jon Lloyd Ebert, Gilroy, CA (US)

(73) Assignee: SC Solutions, Inc., Sunnyvale, CA (US)

( * ) Notice: Subject to any disclaimer, the term of this patent is extended or adjusted under 35 U.S.C. 154(b) by 16 days.

(21) Appl. No.: 11/291,475

(22) Filed: Nov. 30, 2005

(65) Prior Publication Data
US 2006/0106479 A1    May 18, 2006

Related U.S. Application Data

(63) Continuation of application No. 10/751,228, filed on Dec. 30, 2003.

(51) Int. Cl.
*G05B 15/00* (2006.01)
*G05B 13/00* (2006.01)
(52) U.S. Cl. .................................... 700/121; 700/123
(58) Field of Classification Search .................. 700/53, 700/20, 51, 19, 121, 14, 28, 108, 142, 42, 700/96, 123; 451/41, 136, 285, 398, 6, 134; 703/2; 356/630, 237.5
See application file for complete search history.

(56) References Cited

U.S. PATENT DOCUMENTS

| | | | | |
|---|---|---|---|---|
| 6,137,570 | A * | 10/2000 | Chuang et al. ............ | 356/237.5 |
| 6,273,972 | B1 * | 8/2001 | Andler ....................... | 148/522 |
| 6,292,265 | B1 * | 9/2001 | Finarov et al. ............. | 356/630 |
| 6,347,977 | B1 * | 2/2002 | Frost .......................... | 451/6 |
| 6,476,921 | B1 * | 11/2002 | Saka et al. .................. | 356/630 |
| 6,719,615 | B1 | 4/2004 | Molnar | |
| 6,741,903 | B1 | 5/2004 | Bode et al. | |
| 6,798,529 | B2 | 9/2004 | Saka et al. | |
| 6,884,147 | B2 * | 4/2005 | Toprac ......................... | 451/5 |
| 2002/0137448 | A1 * | 9/2002 | Suh et al. .................... | 451/398 |
| 2004/0198180 | A1 * | 10/2004 | Toprac ........................ | 451/5 |

OTHER PUBLICATIONS

SC solution, Inc., Modeling and model-based control for CMP, Jan. 1, 1999, National Science Foundation, SC report No. CMP_001, pp. 1-22.*

(Continued)

*Primary Examiner*—Kidest Bahta
(74) *Attorney, Agent, or Firm*—Michael A. Glenn; Glenn Patent Group

(57) ABSTRACT

The invention provides a model-based control approach to chemical-mechanical planarization (CMP) control. The preferred embodiment comprises mathematical models of the CMP process. These models play a critical role in obtaining superior control performance. Model-based Control Design involves the construction of a dynamic mathematical model of the system to be controlled, e.g. a removal rate model of a CMP system. The model can then be evaluated via computer simulations, and validated using data from the system. The invention provides a method and apparatus that processes in-situ data from a suite of real-time sensors and produces real-time commands to multiple actuators, such as applied pressures, slurry-flow rate, and wafer/pad velocity. A key aspect of the invention is an integrated model-based pressure-temperature-velocity-slurry flow control system that includes many innovations in real-time mode identification, real-time gain estimation, and real-time control.

9 Claims, 8 Drawing Sheets

OTHER PUBLICATIONS

G. F. Franklin, J. D. Powell, A. Emami-Naeini, Feedback Control of Dynamic Systems, 5th Ed., Prentice-Hall, 2006.

G. F. Franklin, J. D. Powell, Michael Workman, Digital Control of Dynamic Systems, 3rd Ed., Addison-Wesley, 1998.

A. Emami-Naeini, J. L. Ebert, R. L. Kosut, D. de Roover, and S. Ghosal, "Model-based Control for Semiconductor and Advanced Materials Processing: An Overview," in Proc. American Control Conference, Jun. 2004.

J. Moyne, E. del Castillo and A. M. Hurwitz, Run-to-Run Control in Semiconductor Manufacturing, CRC Press, 2001.

* cited by examiner

CHEMICAL-MECHANICAL PLANARIZATION CONTROLLER

CROSS REFERENCE TO RELATED APPLICATIONS

This application is a Continuation of U.S. application Ser. No. 10/751,228 filed Dec. 30, 2003.

BACKGROUND OF THE INVENTION

1. Technical Field

The invention relates to chemical-mechanical planarization. More particularly, the invention relates to a chemical-mechanical planarization controller.

2. Description of the Prior Art

Chemical-Mechanical Planarization (CMP) is an important step in the processing of semiconductor wafers and is playing an increasingly critical role in semiconductor microelectronics fabrication (see *The National Technology Roadmap for Semiconductors*, Semiconductor Industry Association, San Jose, Calif. 1997; J. M. Steigerwald, S. P. Murarka, R. J. Gutman, *Chemical Mechanical Planarization of Microelectronic Materials*, Wiley Interscience, 1997; and W. J. Patrick, W. L. Guthrie, C. L. Stanley, and P. M. Schiable, *Application of Chemical Mechanical Polishing to the Fabrication of VLSI Circuit Interconnection*, J. Electrochem. Soc., 138, 1778-1784, 1991).

CMP is a process for material removal that uses chemical and mechanical actions to produce a planar mirror-like wafer surface for subsequent processing. For a nominally uniform wafer, CMP is capable of producing an atomically-smooth and damage-free surface at feature level, which is a basic requirement for semiconductor fabrication below $0.25\mu$ (see *The National Technology Roadmap for Semiconductors*, Semiconductor Industry Association, San Jose, Calif. 1997). The superiority of CMP over traditional etchback techniques with respect to defect reduction and yield enhancement has been demonstrated (for application to tungsten, see K. Wijekoon et al., *Tungsten CMP Process Developed*, Solid State Technology, April 1998). CMP also has fewer processing steps as compared to traditional etchback methods. CMP is also an enabling technology for transition to copper interconnects. Optimal CMP maximizes planarity and minimizes oxide erosion and dishing.

Integrated Circuit (IC) makers continue to adopt CMP for advanced manufacturing, and CMP has now joined standard processing techniques, such as deposition, etch, and lithography in strategic importance. State-of-the-art Application-Specific Integrated Circuits (ASIC) chips, and advanced Dynamic Random Access Memories (DRAMs) are among the latest applications where CMP is being used. Planarization of features on a semiconductor wafer is a critical factor in Ultra Large-Scale Integration (ULSI) processing ($0.25\mu$) for fabrication of multi-levels of wiring and for trench isolation. As device geometries shrink, there are increasingly more stringent requirements on deposition, etch, and lithography due to increases in aspect ratio of device structures. There is a lithography constraint on the step height, i.e. feature variations that require the pattern entirely be confined to within a depth of focus of $\pm 0.3\mu$. For DRAM applications, planarization processes for trench isolation require thickness to be controlled within $\pm 0.1\mu$ or better. This requirement when achieved over all features is referred to as global planarization. For integrating CMOS technologies of a quarter micron ($0.25\mu$ or below), CMP is being used in advanced applications such as Shallow Trench Isolation (STI).

Description of the CMP Process

One distinguishes different kinds of CMP systems by its kinematic motions, e.g. rotational, orbital or linear CMP systems. A schematic of a typical rotational CMP machine is shown in FIG. 1 (see, e.g. J. M. Steigerwald, S. P. Murarka, R. J. Gutmann, *Chemical Mechanical Planarization of Microelectronic Materials*, Wiley Interscience, 1997). The rotating wafer 10 borne by a wafer carrier 11 rests on a rotating pad system 12, consisting of one or more pads. The pad system is part of a polishing table 13. A pressurized retaining ring surrounds the wafer and holds it in place. A nominally uniform load pressure distribution acts on the wafer. For oxide or silicon polishing, an alkaline slurry 14 of colloidal silica is continuously fed to the wafer/pad interface. Although the detailed mechanisms are under investigation, a surface layer forms as a result of chemical processes, and the resulting reaction product is removed by the mechanical abrasive action of the pad and the slurry. The behavior is most complex at the edge of the wafer. The differential velocity and pressures, as well as slurry composition, determine the local removal rate. The dynamic nature of the deformation of the pad determines the local pressure gradients across the wafer and the resulting planarization uniformity. To planarize features across the whole wafer evenly, the material removal rate across the wafer must be uniform.

State-of-the-Art CMP Process Control

The goal of CMP processing is to achieve a specified thickness and uniformity in a repeatable fashion. Major problems in CMP include controlling the material removal or, equivalently, the material removal rate, and the uniformity on each run, and reproducibility from run-to-run. Typically an in-situ sensor is used to detect the end-point of the process, i.e. to detect when the desired amount of material is removed, at which point in time the process is stopped.

A widely used approach for controlling CMP performance involves the following two-step trial-and-error process (see, e.g., R. Allen, C. Chen, K. Lehman, R. Shinagawa, V. Bhaskaran, *CMP: Where Does It End*, Yield Management Solutions Magazine, Vol. 4, No. 1, 2002):

(1) process parameters are adjusted to give good uniformity, and (2) end-point control using an in-situ rate sensor is used to achieve desired material removal thickness.

From a control theory perspective, this approach is called Open-loop control, because the control variables are not adjusted during the run. Neither are these control variables tuned from run to run, but held constant. This approach has at least the following limitations:

First, the process operating window is very narrow, because the process is finely tuned to generate a recipe where the input process parameter values yield acceptable uniformity for most materials. Therefore, the process performance is not robust, being very sensitive to disturbances and input variations, such as pad wear, temperature variations, slurry concentration, sensor drift, etc. Furthermore this approach does not work well for different materials.

Second, if the output specifications for the planarization are changed, then considerable trial-and-error is required to re-establish the input operating conditions necessary to obtain uniformity. These limitations require intensive process monitoring as well as the availability of many (expensive) test wafers.

One approach that addresses some of these limitations is called Run-to-run control. In run-to-run control, the control variables are held constant during the run, but may be modified between runs based on in-line and/or ex-situ (post-process) measurements. This approach works well for compensating slow drifts such as pad wear or slow temperature variations, but does not work for wafer-to-wafer variations such as variations in incoming thickness profile, variations in slurry concentrations, etc.

It would be advantageous to provide an approach that addresses all of these limitations.

SUMMARY OF THE INVENTION

The presently preferred embodiment of the invention, which provides an approach that addresses all of these limitations, is referred to herein as a Model-Based Feedback/Feedforward control approach. This type of control is called Feedback/Feedforward because the control variables are adjusted during the run based on in-situ measurements. This type of control is unprecedented in the history of CMP applications. For this purpose, the dynamic behavior of the CMP system during a run has to be taken into account. The inventors have developed a detailed physics-based dynamic mathematical model of the CMP process (including chemistry), as well as reduced dynamic models for control. These models play a critical role in obtaining superior control performance. Model-based control design involves the construction of a physics-based mathematical model of the system to be controlled, e.g. a removal rate model of a CMP system. The model can then be evaluated via computer simulations and validated using experimental data from the system.

The order and complexity of the model depends on the application. Typically, the order is large for equipment design evaluation purposes. A reduced-order model is constructed for feedback control system design. The closed-loop control system is first evaluated via a computer simulation. Once satisfactory results are obtained with the simulation, the feedback controller is used to control the actual system. This approach not only provides physical insight into the open-loop and closed-loop behavior of the system, but also can be used to extract maximum performance from a given system. Because a physics-based mathematical model is constructed, modifications of the system can be evaluated via computer simulations prior to any hardware modifications. In essence, one can construct a virtual engineering environment, which can be used to evaluate and optimize system designs before expensive equipment or hardware is purchased.

The use of custom embedded feedback control is becoming more critical in semiconductor manufacturing equipment. The herein disclosed model-based feedback/feedforward control design technology provides a systematic process for modeling, simulation, and controller design. The approach herein disclosed has the capability to extract maximum performance from complex multi-input multi-output processes, which have a high degree of interaction between various process inputs and outputs. Traditional single-input single-output design approaches would limit the kind of performance that can be achieved in systems with strong coupling between various input and/or output variables.

DETAILED DESCRIPTION OF THE INVENTION

In-Situ Sensing (25, 27)

A recent development in CMP is the use of real-time in-situ sensors, such as optical or optical-eddy-current sensors 25 to monitor wafer-scale as well as die-scale uniformity, and allow real-time feedback control of wafer uniformity. The primary objective is to control global planarity. Therefore, it is necessary to sense variations (non-uniformity) in the removal rate at the wafer-scale as well as die-scale. Off-line metrology can be used to monitor both wafer as well as die-scale uniformity, and the resulting measurements can be used for run-to-run control. Several sensors have been proposed for and used in CMP for monitoring the material removal rate. See M. Sun, H.-M. Tzeng, H. Litvak, D. Glenn, *In-situ Detection of Film Thickness Removal During CMP of Oxide and Metal Layers*, Proc. CMP-MIC, February 1996; S. Inaba, et. al., *Study of CMP Polishing Pad Control Method*, CMP-MIC Conference, 1998 IMIC-300P/98/0044, pp. 44-51, 1998; KLA-Tencor, Press Release, Mar. 5, 2001; G. Dishon, et. al., *On-Line Integrated Metrology for CMP Processing*, VMIC Specialty Conferences, CMP Planarization, pp. 1-5, 1996; L. Chen, C. Diao, *A Novel In-Situ Thickness Measurement Method Using Pad Temperature Monitoring For CMP Technology*, CMP-MIC Conference, 1996 ISMIC-100P/96/0241, pp. 241-248, 1996; M. Sun, H.-M. Tzeng, H. Litvak, D. Glenn, *In-situ Detection of Film Thickness Removal During CMP of Oxide and Metal Layers*, Proc. CMP-MIC, February 1996; S. Inaba, et. al., *Study of CMP Polishing Pad Control Method*, CMP-MIC Conference, 1998 IMIC-300P/98/0044, pp. 44-51, 1998.

It is anticipated that the invention herein disclosed may as well be applied to augment some of the existing optical sensors with pattern recognition capabilities that enable these sensors to monitor wafer-scale as well as die-scale uniformity in real-time. Other sophisticated sensor technologies will most certainly be introduced in the future for CMP closed-loop in-situ control. The invention herein is likewise applicable with these new sensors.

Advanced CMP Model (21)

Figure 1:
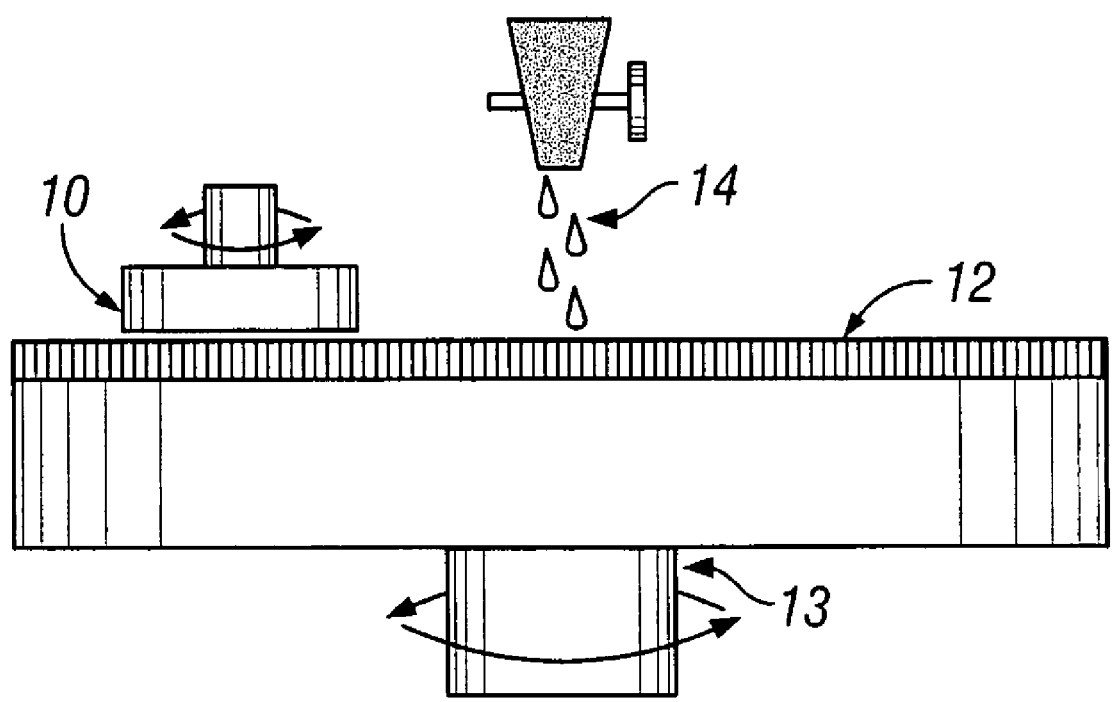
FIG. 1 is a schematic of a typical rotational CMP machine.
Figure 2:
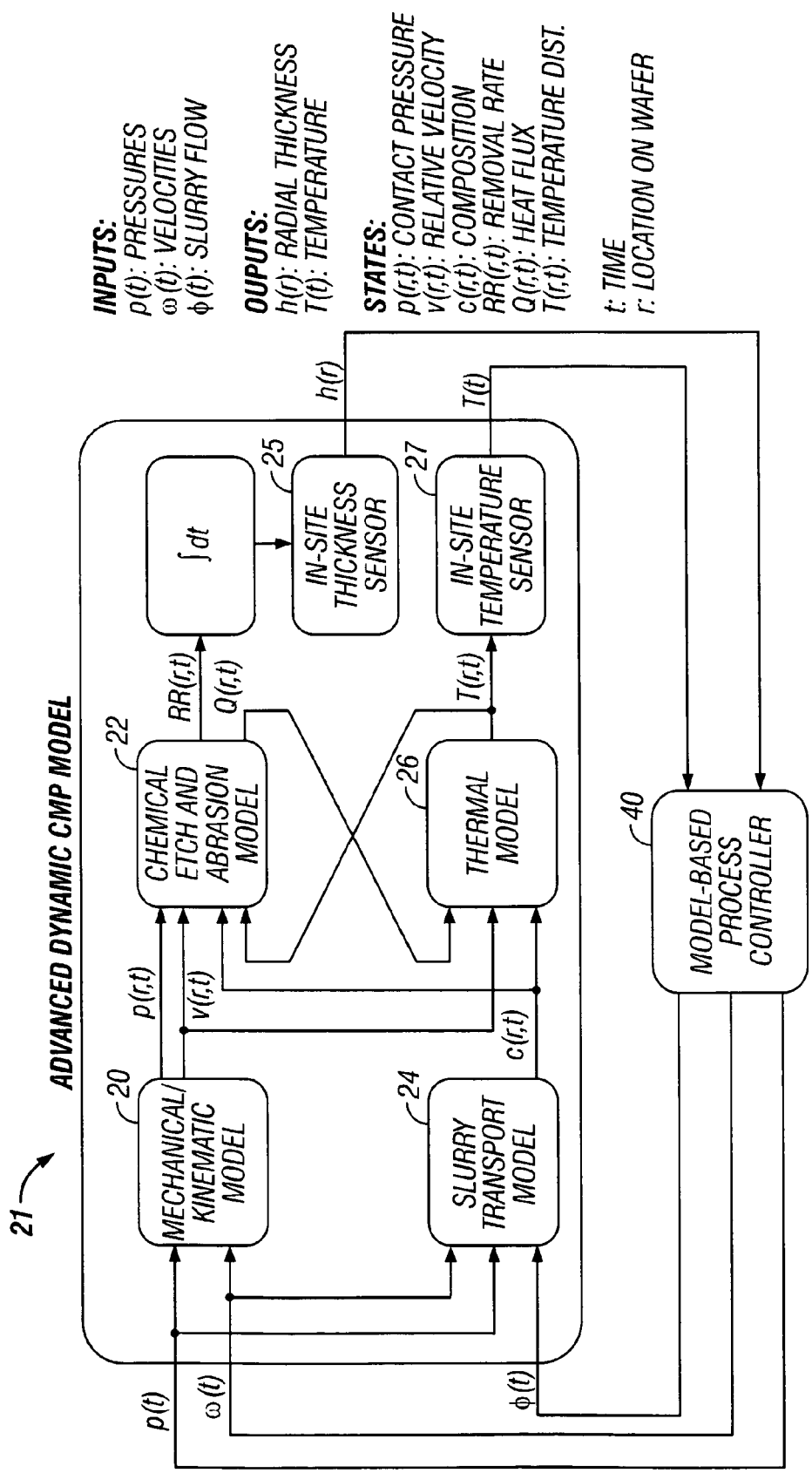
FIG. 2 is a block schematic diagram of an advanced dynamic CMP model according to the invention.

FIG. 2 is a block schematic diagram of an advanced dynamic CMP model 21 according to the invention. The physical processes involved in CMP are a complex combination of chemistry, abrasion, and mechanics. At the highest level, a global model has externally controllable variables, e.g. applied pressures, slurry flow rate, wafer/platen velocity, etc., designated as inputs and predicts the material removal rate $RR(x, t)$ as a function of time t, and location on the wafer x, as well as the temperature $T(t)$ as a function of time. This global model is formed from a combination of several different component models. Specifically, a contact mechanical model 20 predicts the contact pressure and relative velocity between the pad and the wafer surface. A chemical and mechanical model 22 predicts the local removal rate as a function of local slurry, pad, and wafer properties. A transport model 24 predicts the distribution of slurry, pad, and wafer properties across the wafer/pad interface. Finally, a thermal model 26 predicts the temperature distribution at the wafer/pad interface necessary for accurate chemistry and transport modeling. For purposes of controlling Within-Wafer Non-Uniformity (WIWNU), the wafer-scale models are of greatest interest and not die- or feature-scale models. These four models are interdependent because local polishing and transport depend on both pressures and velocities; temperature depends on friction and chemistry; and chemistry and transport depend on temperature. Thus, the division between models is primarily based on the different physical processes each represents.

Figure 3:
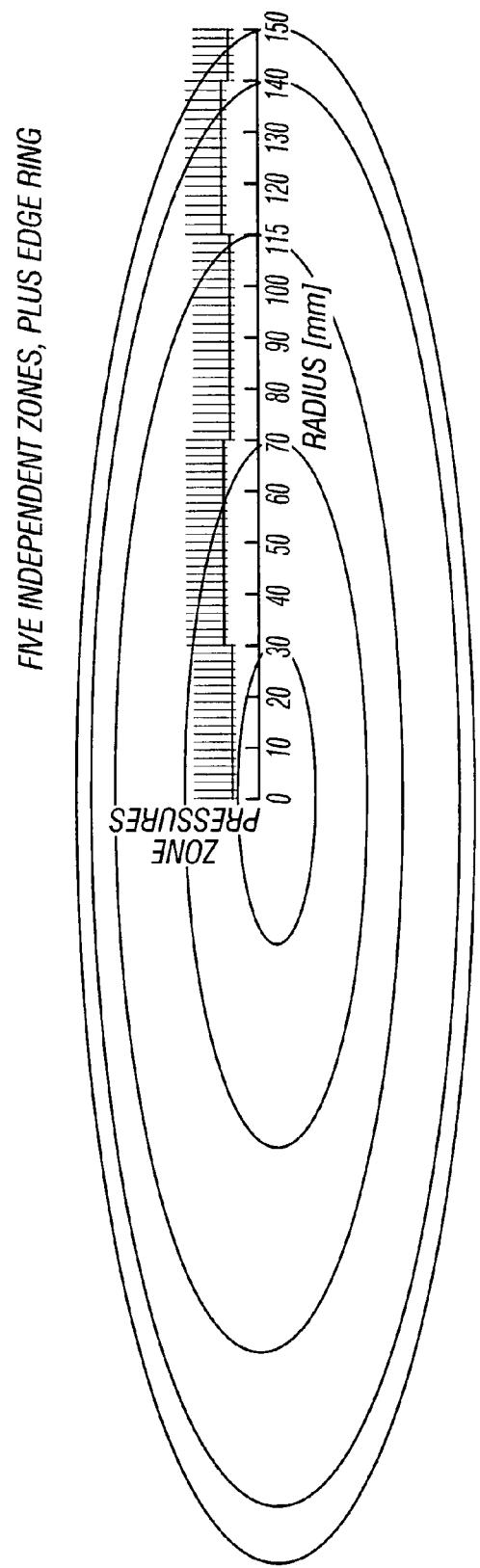
FIG. 3 is an example of a multi-zone pressure actuation model according to the invention.

The mechanical and kinematic model for the contact pressure and relative velocity between the wafer and pad is fairly well understood (see G. Fu, A. Chandra, S. Guha, G. Subhash, *A Plasticity-Based Model of Material Removal in Chemical-Mechanical Polishing (CMP)*, IEEE Transactions on Semiconductor Manufacturing, Vol. 14, No. 4, 406-417, November 2001; and G. Fu, A. Chandra, *Effects of Viscoelastic Pad Deformation on Material Removal Rate in Chemical Mechanical Planarization*, Proc. CMP-MIC Conference, pp. 67-76, February 2002). Some primary uncertainties are the mechanical properties of the pads and the effective friction between the pad and wafer. Edge effects have been successfully modeled, but due to their high sensitivity to pad properties, it is common to augment or tune pure physics-based mathematical models with experimental results to match edge effects. This approach of starting with a basic model that accurately represents the main physics of the problem and tuning with experimental results has produced excellent semiempirical models for control design. The mechanical model supports generic multi-zone pressure actuation. An example of a multi-zone pressure actuation model is shown in FIG. 3.

The polishing model involves predicting the removal rate at a given time and wafer location as a function of contact pressure, relative wafer/pad velocity, abrasive particle concentration and size distribution, and slurry/wafer chemistry. The mechanical, thermal, and transport models are used to determine the value of the variables at all times and locations on the wafer. In CMP, as compared to pure mechanical polishing, the slurry reacts with the wafer to form a thin layer on the wafer surface with modified composition and morphology (see G. Fu, A. Chandra, S. Guha, G. Subhash, *A Plasticity-Based Model of Material Removal in Chemical-Mechanical Polishing (CMP)*, IEEE Transactions on Semiconductor Manufacturing, Vol. 14, No. 4, 406-417, November 2001; J. Luo, D. A. Dornfeld, *Material Removal Mechanism in Chemical Mechanical Polishing: Theory and Modeling*, IEEE Transactions on Semiconductor Manufacturing, Vol. 14, No. 2, pp. 112-133, May 2001; and J. Luo, S. Aksu, D. A. Dornfeld, *Material Removal Regions in Chemical Mechanical Polishing: Coupling Effects of Slurry Chemicals, Abrasive Size Distributions and Wafer-Pad Contact Area*, Proc. CMP-MIC Conference, pp. 49-58, February 2002). This thin layer is then mechanically removed by abrasion by the particles in the slurry.

In general, there are two limiting modes, a hydrodynamical contact mode and a solid-solid polishing mode. If the pressure is low and the relative velocity is high, the wafer does not touch the pad, but instead rides on a thin layer of slurry. Abrasion occurs when particles within the slurry impact the wafer. In the solid-solid polishing mode the wafer contacts the pad and abrasion occurs by particles partially embedded in the pad. Models for the solid-solid contact mode are fairly well-developed (see J. Luo, D. A. Dornfeld, *Material Removal Mechanism in Chemical Mechanical Polishing: Theory and Modeling*, IEEE Transactions on Semiconductor Manufacturing, Vol. 14, No. 2, pp. 112-133, May 2001; and J. Luo, S. Aksu, D. A. Dornfeld, *Material Removal Regions in Chemical Mechanical Polishing: Coupling Effects of Slurry Chemicals, Abrasive Size Distributions and; Wafer-Pad Contact Area*, Proc. CMP-MIC Conference, pp. 49-58, February 2002), but there is still considerable research being done.

The transport model describes the distribution of slurry and abrasive particles across the pad. Factors such as wafer rotation rate, applied pressures, and location and slurry flow rate all affect the transport of the slurry. Because the slurry viscosity is somewhat temperature-dependent, transport may have a small dependence on temperature.

As material is removed from the wafer the chemical bonds are broken, thus releasing energy. Similarly, viscous dissipation in the slurry releases energy that affects the local temperature of the slurry, pad, and wafer. Therefore, the temperature of the slurry, pad, and wafer all change during the polishing process. Because the chemistry between the slurry and the wafer is usually fairly strongly dependent on temperature, a temperature model improves the polishing model.

Exemplary Model-Based CMP Process Controller

Figure 4:
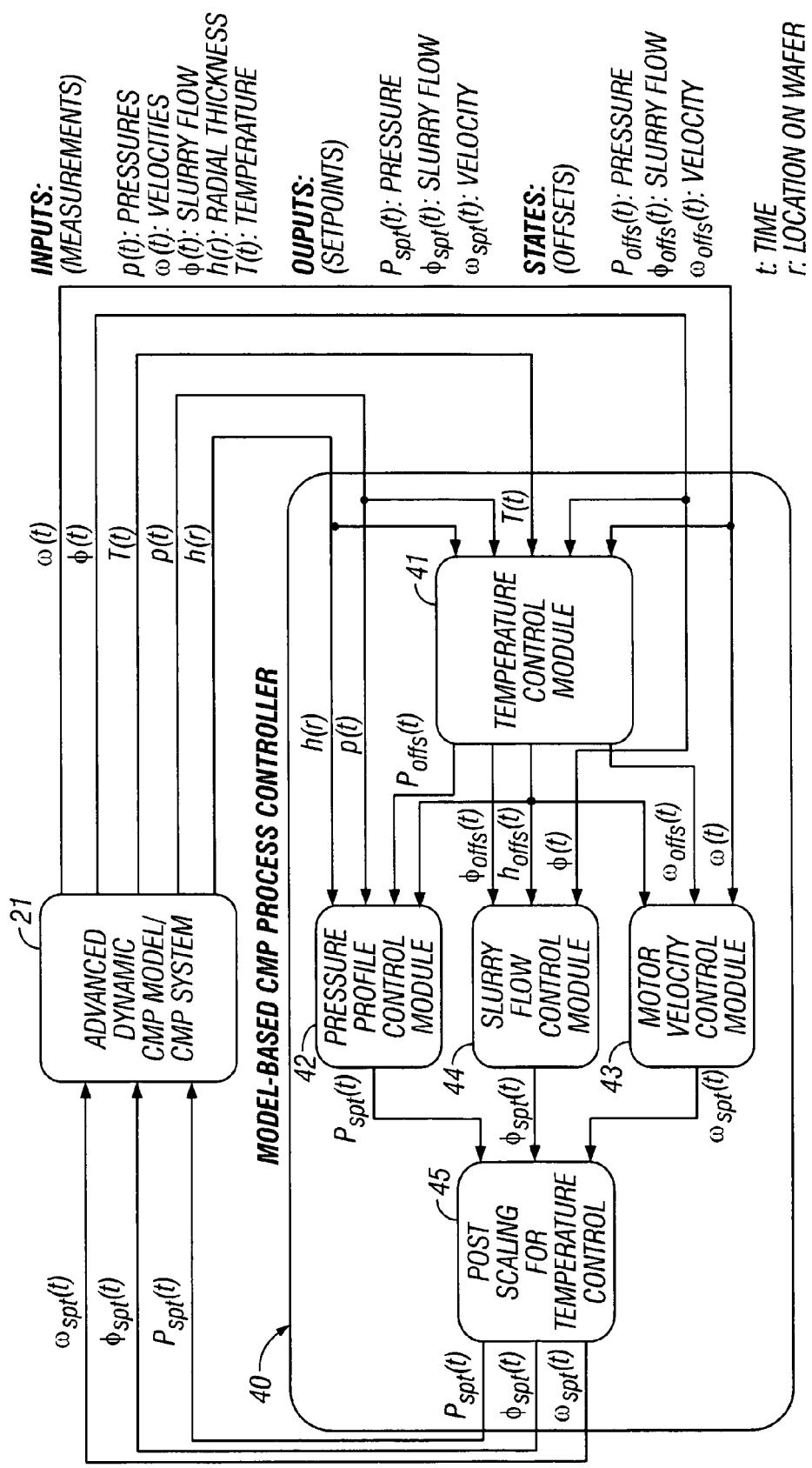
FIG. 4 is a block schematic diagram of an exemplary CMP controller according to the invention.

An exemplary CMP controller 40 consists of five modules, see FIG. 4. These modules are described in the following discussion.

Temperature Control Module (41)

Many slurries for copper CMP are temperature sensitive, i.e. the copper removal rate depends on the local temperature of the wafer and pad, see H. Chiou, Z. Lin, L. Kuo, S. Shih, L. Chen C. Hsia, *Thermal Impact and Process Diagnosis of Copper Chemical Mechanical Polish*, Proc. IEEE International Interconnect Technology Conference, pp. 83-85, 1999; and D. White, J. Melvin D. Boning, *Characterization and Modeling of Dynamic Thermal Behavior in CMP*, J. The Electrochemical Society, Vol. 150, No. 4, pp. 271-278, 2003. The temperature varies across the wafer as cool slurry flows in one side and is heated by frictional heat generation between the wafer and pad. If one could measure wafer temperature at several points on the wafer, one would see smoothly varying mode-shapes as a function of time and actuation variables that influence temperature, such as applied pressures, slurry flow rate and motor velocities. These smoothly varying time- and actuation-dependent temperature mode-shapes determine in part the local removal rate on the wafer.

The herein disclosed temperature control module controls the average pad temperature, for example responsive to temperatures measured by an in-situ temperature sensor 27 and a thermal model (discussed above; see FIG. 2), such that the resulting wafer profile is as uniform as physically possible at the end of the polish. See FIG. 5, which shows a schematic of the temperature control module.

Mode Shape Identification (51)

First, one has to define what it means to obtain a wafer profile that is as uniform as physically possible, i.e. maximum planarization achievable by the equipment. There are several metrics to measure the uniformity of a wafer. A well-known metric is Within-Wafer-Non-Uniformity (WIWNU), which basically is defined as the $l_2$-norm (Euclidean vector norm) of the profile divided by its average. Another metric is defined as the difference between the maximum and the minimum thickness across the wafer. The data points at the edge of the wafer are usually excluded from these calculations, e.g. a 3-5 mm edge exclusion zone. The presently preferred metric for wafer uniformity is the $l_2$-norm of a $2^{nd}$ and $4^{th}$ order identified mode shape of the wafer profile. This is explained below.

It is assumed that a new diameter scan of wafer thickness is available each time the controller is called. Each time a new measurement is available, the measured wafer profile is approximated by fitting an nth order polynomial through this data using standard least-squares. Let h(r) denote the measured data as a function of position r across a diameter scan. Let p(r) denote an $n^{th}$ order polynomial in r:

$$p(r) = \sum_{k=0}^{n} c_k \bar{r}_k, \quad (1)$$

where:

$$\bar{r}_k = \frac{r_i^k}{\bar{m}_k}, \ i = -N, \ldots 0, \ldots, N; \ k = 0, \ldots, n; \quad (2)$$

$$\bar{m}_k = \max_i (r_i^k).$$

The vectors $\bar{r}_k$, k=0 . . . n, are called normalized base vectors or mode shapes of the profile p(r). The coefficients $c_k$, k= 0 . . . n are called mode shape coefficients. In the following n=4 is used since that typically provides enough resolution to model a wafer profile. However, the inventive method is not limited to n=4. With n=4, Equation (1) becomes:

$$p(r) = c_0 \bar{r}_0 + c_1 \bar{r}_1 + c_2 \bar{r}_2 + c_3 \bar{r}_3 + c_4 \bar{r}_4. \quad (3)$$

Figure 6:
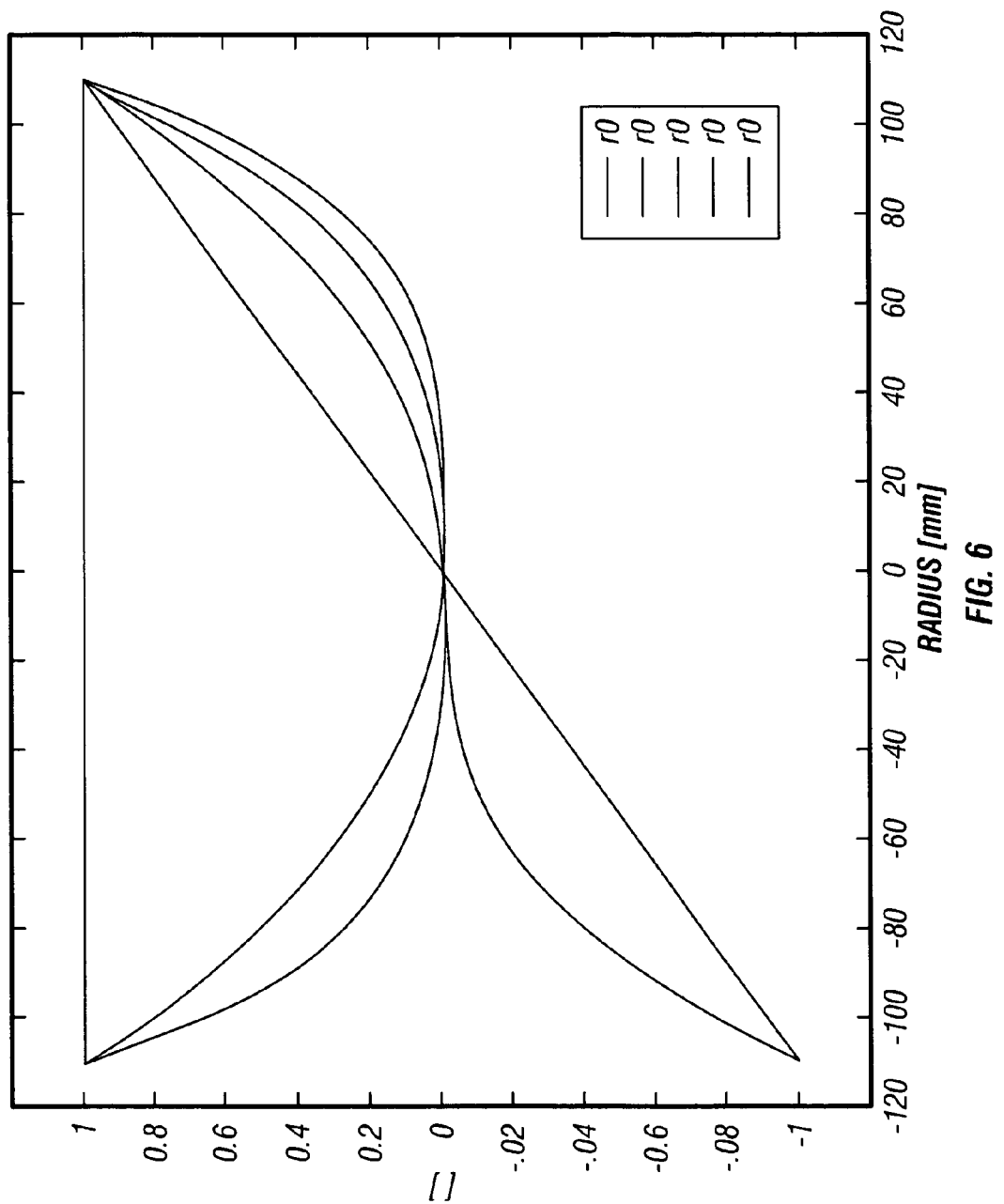
FIG. 6 is a graph showing typical normalized base vectors according to the invention.

FIG. 6 shows the normalized base vectors for this case. The mode shape coefficients $c_k$, k=0 . . . 4 are estimated by solving:

$$\underbrace{\begin{bmatrix} h(r_{-N}) \\ \vdots \\ h(r_N) \end{bmatrix}}_{\bar{h}} - \underbrace{\begin{bmatrix} 1 & \bar{r}_1(-N) & \bar{r}_2(-N) & \bar{r}_3(-N) & \bar{r}_4(-N) \\ \vdots & \vdots & \vdots & \vdots & \vdots \\ 1 & \bar{r}_1(N) & \bar{r}_2(N) & \bar{r}_3(N) & \bar{r}_4(N) \end{bmatrix}}_{R} \cdot \underbrace{\begin{bmatrix} c_0 \\ c_1 \\ c_2 \\ c_3 \\ c_4 \end{bmatrix}}_{c} = \begin{bmatrix} 0 \\ \vdots \\ 0 \end{bmatrix}. \quad (4)$$

By solving this standard least-squares problem at each time-step when new measurements are available and storing the results, one can monitor the evolution of the mode shape coefficients as a function of time, t: $c_0(t)$, $c_1(t)$, etc. The first coefficient, $c_0$, is an estimate of the average or mean of the measured profile h(r). The coefficients $c_1$ and $c_3$ are estimates of the asymmetry in the profile h. Because the wafer is rotating, it is assumed that any asymmetry on the wafer is eventually averaged out to zero. The coefficients $c_2$ and $c_4$ determine the uniformity of the profile h, and are therefore the coefficients of interest. A large negative coefficient $c_2$ typically denotes an edge-thin profile and a large positive coefficient $c_2$ typically denotes an edge-thick profile. Likewise, the coefficient $c_4$ contains information about the steepness of the edge. If $c_4$ is relatively large with respect to $c_2$, typically the profile h has a uniform center with steep edge. If $c_4$ is relatively small with respect to $c_2$, typically the profile h gradually increases or decreases from center to edge. A good metric of the uniformity of the profile h is the $l_2$-norm of the approximate profile determined by the coefficients $c_2$ and $c_4$:

$$\|c_2 \bar{r}_2 + c_4 \bar{r}_4\|_2 = \sqrt{\sum_{i=-N}^{N} \left( c_2 \frac{r_i^2}{\bar{m}_2} + c_4 \frac{r_i^4}{\bar{m}_4} \right)^2} \quad (5)$$

-continued $$= \sqrt{\sum_{i=-N}^{N} \left( c_2^2 \frac{r_i^4}{\bar{m}_2^2} + 2 c_2 c_4 \frac{r_i^6}{\bar{m}_2 \bar{m}_4} + c_4^2 \frac{r_i^8}{\bar{m}_4^2} \right)}$$

$$= \sqrt{c_2^2 \underbrace{\frac{1}{\bar{m}_2^2} \sum_{i=-N}^{N} r_i^4}_{v_\alpha} + c_2 c_4 \underbrace{\frac{2}{\bar{m}_2 \bar{m}_4} \sum_{i=-N}^{N} r_i^6}_{v_\beta} + c_4^2 \underbrace{\frac{1}{\bar{m}_4^2} \sum_{i=-N}^{N} r_i^8}_{v_\gamma}}.$$

Figure 7:
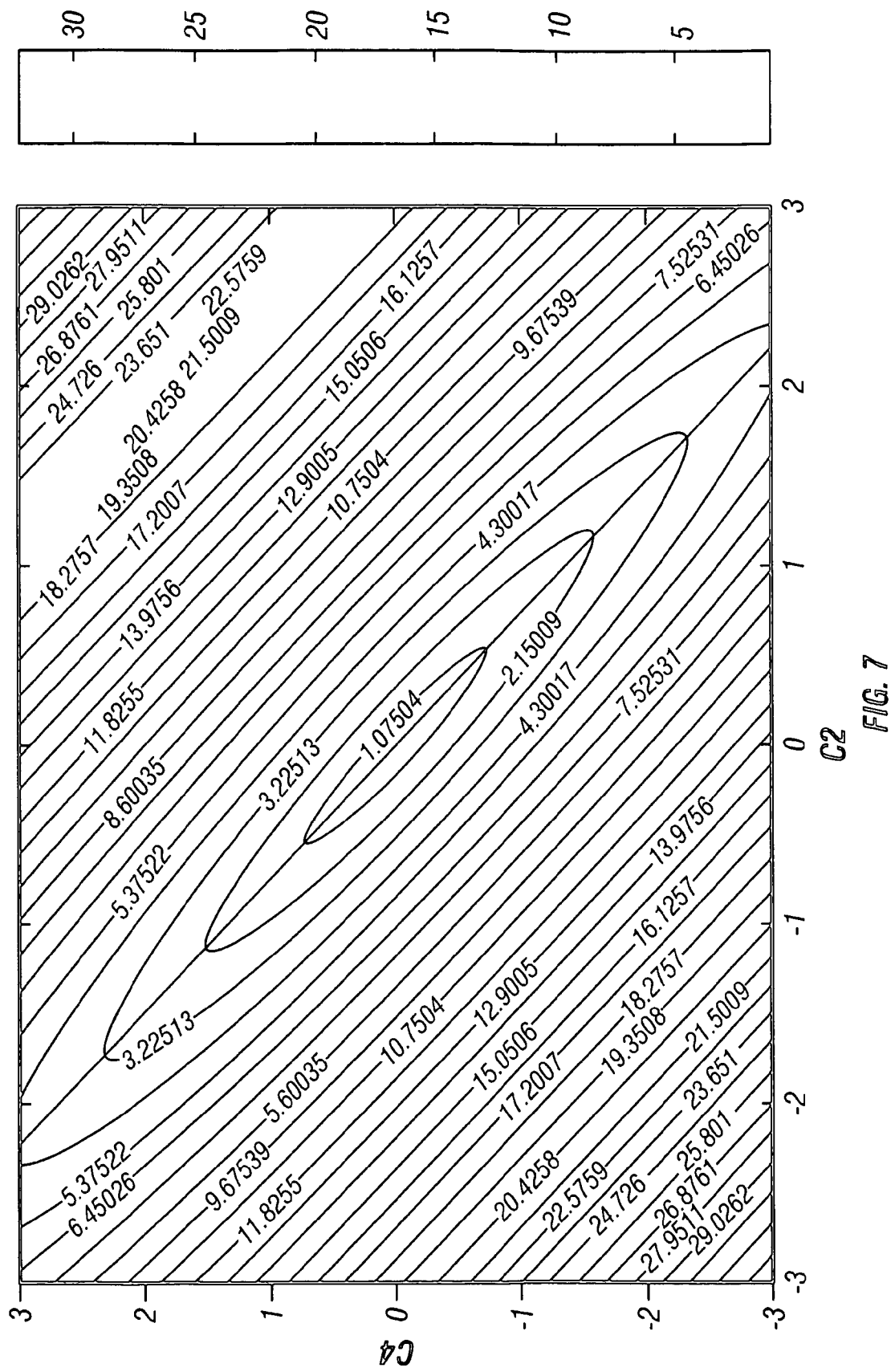
FIG. 7 is a typical plot showing the resulting mesh as a function of $c_2$ and $c_4$ for Equation (5) according to the invention.

The scalars $v_\alpha$, $v_\beta$ and $v_\gamma$ can be computed a priori and stored in memory. Independent of the incoming profile h, one can compute Equation (5) for a given range of $c_2$ and $c_4$ values and plot the resulting mesh as a function of $c_2$ and $c_4$, see FIG. 7. The isonorms in this figure form rotated ellipses because of the quadratic form of Equation (5). The mesh in FIG. 7 has a global minimum at the point $(c_2, c_4)=(0, 0)$. The mesh has an infinite number of local minima along the dotted line that is defined by the angle of rotation of the ellipse, i.e. for any given value $c_2$, there is a unique value $c_4$ that yields the minimum $l_2$-norm of the profile determined by $c_2$ and $c_4$. This line of minima can be parameterized as:

$$c_4 = \alpha \cdot c_2, \quad (6)$$

with $$\alpha = -\tan\left( \frac{\pi}{2} - \left( \frac{\pi}{4} - \frac{1}{2} \tan^{-1}\left( \frac{v_\alpha - v_\gamma}{v_\beta} \right) \right) \right).$$

For N=100 in Equation (5), the value of $\alpha$ in Equation (6) is −1.345. For N=150, the value of $\alpha$ is −1.349, i.e. $\alpha$ is not a strong function of the value of N.

It is now possible to give a mathematical answer to the question "What does as uniform as physically possible mean?" A profile with $c_2$ and $c_4$ both equal to zero is as uniform as theoretically possible, i.e. a straight perfectly horizontal profile, but this unique minimum is not always physically possible because there are a limited number of actuators. It is likely that either $c_2$ can be zero or $c_4$ can be zero, but it is unlikely that both are zero at the same time. However, as can be seen from FIG. 7, if only one of the two is zero, the minimum norm of the final resulting profile is not achieved. Therefore, if one of the coefficients is non-zero, the minimum norm of the final resulting profile is achieved only if the other coefficient is such that the point $(c_2, c_4)$ is on the line given by Equation (6). If that can be accomplished, the physically best-possible profile uniformity is achieved. Driving the profile toward a point on this line is the task of the Master Control Loop 53, see FIG. 5.

Master Control Loop (53)

To drive the wafer profile to a state such that the point $(c_2, c_4)$ is on the line given by Equation (6), define the time-dependent control function s(t):

$$s(t) = c_4(t) - \alpha \cdot c_2(t), \quad (7)$$

with $\alpha$ as defined in Equation (6). The objective of driving $(c_2, c_4)$ toward the line defined by Equation (6) can now be replaced by the objective of driving the control function s(t) toward zero over time (and keep it at zero). To drive the control function to zero in a finite amount of time, the rate of s(t) has to be such that:

$$\frac{ds(t)}{dt} \le -\eta \text{ for } s(t) > 0, \quad (8)$$

$$\frac{ds(t)}{dt} \ge +\eta \text{ for } s(t) < 0.$$

for some positive constant $\eta$. This condition can be reformulated as:

$$s(t)\frac{ds(t)}{dt} \le -\eta|s(t)|, \eta > 0. \quad (9)$$

If the condition of Equation (9) is met, the control of s(t) is a converging control.

Again, the invention controls (or influences) the profile s(t) by controlling average wafer/pad temperature. Temperature, in turn, cannot be controlled directly, but is controlled by adjusting the input pressures, slurry flow rate, and wafer/pad velocities, see FIG. 2. In other words, if the master control loop requests a certain temperature, the slave loops translate that to corresponding values of pressure, slurry flow rate, and velocities. For this reason, it is critical to have a sufficiently accurate dynamic model that relates pressure, slurry flow rate, and velocities to wafer/pad temperature.

Dynamic Temperature Model (52)

Figure 5:
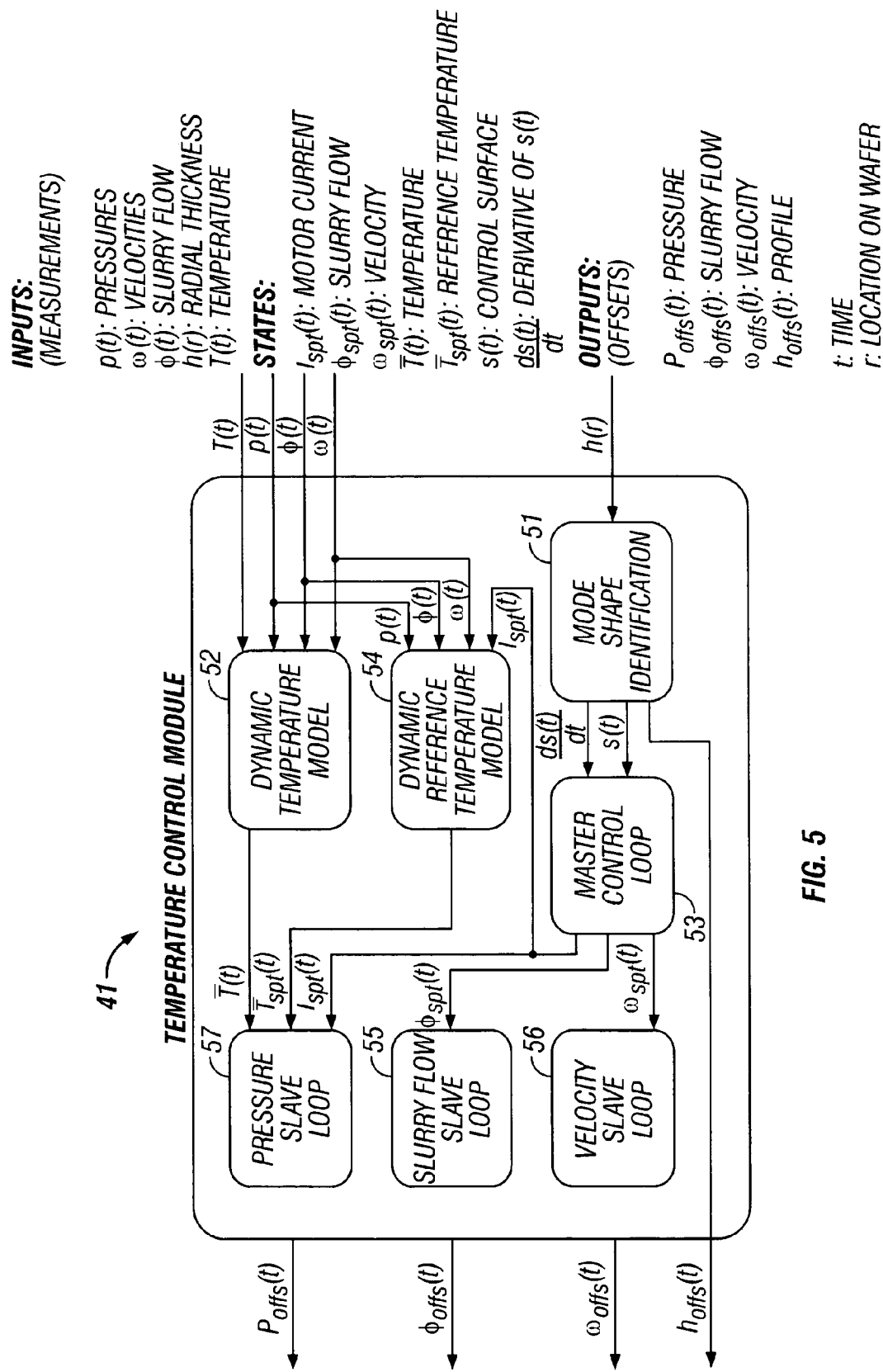
FIG. 5 is a block schematic diagram showing a temperature control module according to the invention.

The two blocks in FIG. 5, Dynamic Temperature Model 52 and Dynamic Temperature Reference Model 54 both represent a dynamic model that describes the evolution of average wafer/pad temperature over time. The Dynamic Temperature Model describes the average wafer/pad temperature and can be replaced by a temperature measurement if a temperature sensor 27 is available, or used in an estimator to improve noisy measurements. The Dynamic Temperature Reference Model describes desired or reference wafer/pad temperature and is driven by the master control loop.

The dynamic temperature model is an energy balance for a volume at the wafer/pad interface. This balance says that the rate of change of internal energy in that volume is equal to the net power transported into the volume. The net power into the volume includes three terms: 1) conduction to and from the slurry and surroundings, 2) slurry transport into and out of the volume, and 3) power generation through friction at the wafer/pad interface. The first term is proportional to the average temperature difference between the interface and the slurry or surroundings. The second term is proportional to slurry flow. The third term is proportional to the applied pressure. The latter two terms relate actuator inputs (slurry flow, velocity and pressure) to the pad temperature. Uncertain parameters in this model can be adjusted using experiments to provide agreement between the model and the system. The resulting expression is of the form $$\frac{dT}{dt} = K_c(T - T_s) + K_s Q_s + K_f Q_f. \quad (10)$$

Here T and $T_s$ are the interface and slurry or surrounding temperatures, respectively. The slurry flow rate into the interface between the pad and wafer depends on the specific transport and distribution of slurry, and is described by the quantity $Q_s$. The frictional power dissipation between the slurry and pad is $Q_f$ and is generally a function of the rotation rate and applied pressure on the pad. The three empirical constants ($K_c$, $K_s$, $K_f$) are determined experimentally for a particular application.

The frictional power generation, $Q_f$ can be measured directly by measuring the electrical power, e.g. motor current, used to drive the rotation motors. After correcting for dissipation in the motors and bearings, and for acceleration terms during unsteady operation, what remains is the frictional power at the wafer/pad interface. This observation is important and novel. It indicates that the thermal model described above can also be the basis for a temperature sensor since it directly relates temperature to the frictional power dissipation through a relatively simple ordinary differential equation, Equation (10).

Dynamic Temperature Reference Model (54)

As mentioned above, the Dynamic Temperature Reference Model 54 describes desired or reference wafer/pad temperature and is driven by the master control loop. In effect, it runs the same temperature model as described, except that it is not driven by the pressures p(t)—apart from the initialization stage, but by a desired motor current set point $1_{spt}(t)$. After the initialization stage, the reference temperature $T_{ref}(t)$ calculated from the reference temperature model represents the desired CMP process temperature at every time instant. Based on the results from the mode shape identification, the master control loop determines the desired temperature and decides when and how to get at that temperature by changing the motor current set point $1_{spt}(t)$ accordingly.

Pressure Slave Loop (57)

The pressure slave loop 57 is a feedback controller combined with feedforward control based on the Dynamic Temperature Model 52, see, e.g. G. F. Franklin, J. D. Powel, A. Emami-Naeini, *Feedback Control of Dynamic Systems*, 4$^{th}$ edition, Prentice Hall, 2002. The inputs to the pressure slave loop are the process temperature, T(t), either from a sensor or from the model 52, the desired reference temperature, $T_{ref}(t)$, and the motor current set point $1_{spt}(t)$, respectively, see FIG. 5. First, a nominal (feedforward) set point pressure is computed by substituting the desired motor current set point into the model 52 and back calculating the corresponding desired pressures. Next, a pressure correction is added by feeding the tracking error $e(t) = T_{ref}(t) - T(t)$ into the feedback controller. The resulting output pressures are called offset pressures, $p_{offs}(t)$, which feed into the Pressure Profile Control Module 42, see FIG. 4.

Slurry Flow and Velocity Slave Loop (55)

Similar to the pressure slave loop, the slurry flow and velocity slave loops are fed by set point values coming out of the master control loop. Slurry flow and velocity are directly influenced by temperature according to the Dynamic Temperature Model 52. They can therefore be used to control temperature as well. These two controls have to be used with great care though. The main use of slurry flow is not to control temperature, but to add the right chemistry composition to the CMP process, see FIG. 2. Control of temperature is a secondary function of slurry flow. However, the master control loop can determine that the pressure slave loop is not able to control the profile adequately, in which case it can decide to activate the slurry flow slave loop to help the pressure slave loop. For example, if a process runs too hot for too long, the pressure slave loop likely saturates the pressures low, which slows down the polish rate according to Preston's equation, see F. W. Preston, *The Theory and Design of Plate Glass Polishing Machines*, J. Soc. Glass Technology, Vol. 11, pp. 214-256, 1927. If the pressures saturate low for too long and the temperature is still too high, it is advantageous to increase the slurry flow to remove heat and cool the process to its desired temperature.

Similarly, increasing or decreasing the velocity increases or decreases the process temperature. Velocity, however, also affects the polish rate according to Preston's equation, and should therefore be handled with care. Furthermore, velocity typically also determines the rate of data acquisition of the sensors. Changing the velocity throughout the polish changes this acquisition rate, and care has to be taken to handle this change correctly.

Similar to the outputs of the pressure slave loop, the outputs of the slurry flow and velocity slave loop, are offset slurry flow and offset velocity feeding into the Slurry Flow and Motor Velocity Control Module 43, respectively, see FIG. 4.

Pressure Profile Control Module (42)

Figure 8:
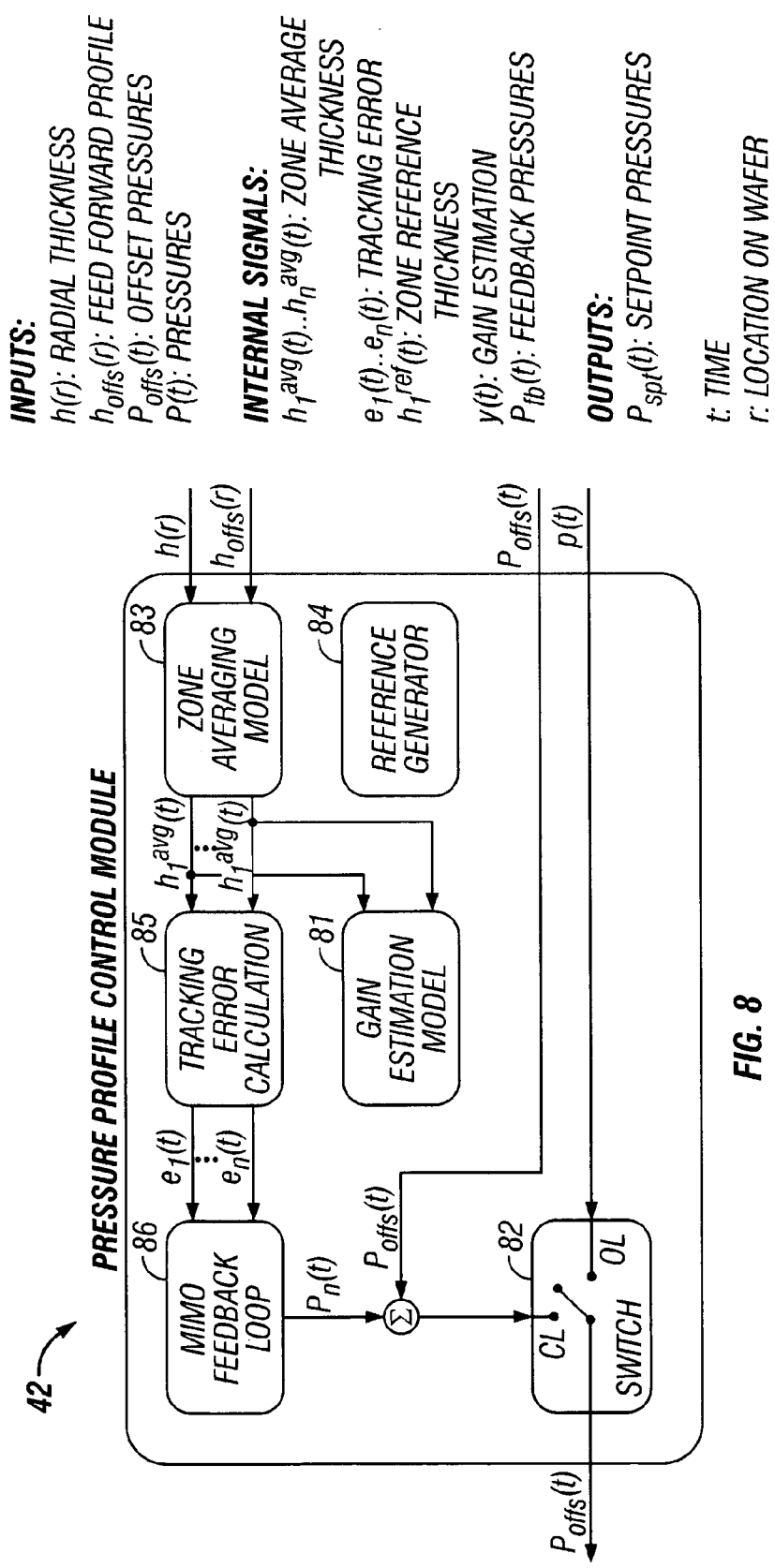
FIG. 8 is a block schematic diagram showing a pressure profile control module according to the invention.

The Pressure Profile Control Module 42 controls the individual zone pressures for a multi-zone pressure CMP process, see FIG. 3 and FIG. 8. The herein disclosed Pressure Profile Control Module is the first of its kind to perform multivariable in-situ pressure feedback using multivariable in-situ wafer thickness measurements, as obtained with an in-situ thickness sensor 25 (see FIG. 2). One goal is to adjust the pressures in-situ such that a uniform wafer thickness is obtained at the end of each polish, independent of incoming wafer profile and/or process disturbances.

Zone-Averaging Model (83)

One goal of the zone-averaging model 83 is to extract more-or-less-independent thickness information from the measured wafer profile h(r), r=−N ... N, for each of the pressure zones. Assume that there are n independent pressure zones. Although not required, it is desired to extract n different thickness measurements. The main reason for extracting the same number of measurements as there are pressure zones is that this way the feedback controller becomes a Multi-Input-Multi-Output (MIMO) controller with equal number of inputs and outputs (this is called a square MIMO controller), which makes the control design more convenient. If there are more pressure actuation zones than thickness measurements, the pressure control is typically not unique because there is an infinite number of pressure combinations that affect the thickness measurement in the same way. If there are more thickness measurements than pressure actuation zones, the pressure control typically is not able to achieve an independent objective for all thickness measurements. An equal number of thickness measurements (sensors) and pressure zones (actuators) is therefore typically the best choice.

It is not obvious how to extract n measurements from 2N data points where n<<2N. One way is to divide the profile into n sections that correspond more-or-less to the physical locations of the pressure zones and then take an unweighted average in each zone. This is a good first attempt but typically does not result in the most uniform profile as measured by, e.g. the Within-Wafer-Non-Uniformity (WIWNU) metric. The problem is that it is desirable that the entire profile of 2N points be as uniform as possible, but one can only control n independent zones. If a 300 mm (12-inch diameter) wafer is measured with measurements spread 2 mm apart, then N=75. A multi-zone pressure head could have as few as two and perhaps at most ten independent pressure zones, which makes it a hard problem to extract two to ten measurements out of 150 data points for pressure feedback such that all 150 data points are as uniform as possible at the end of the polish. The herein disclosed Pressure Profile Control Module implements an innovative model-based way for selecting n measurements from 2N data points.

The mechanical/kinematic model shown in FIG. 2 models the contact pressure between wafer and pad in a finite number of nodes as a function of the input pressures in the different zones. If the number and location of these contact nodes selected is equal to the nodes where wafer thickness is measured, one can compute a gain matrix B that relates contact pressure to input pressure in steady-state:

$$\begin{bmatrix} p_N^c \\ p_{N-1}^c \\ \vdots \\ p_{-N+1}^c \\ p_{-N}^c \end{bmatrix} = \underbrace{\begin{bmatrix} b_{N1} & \cdots & b_{Nn} \\ b_{N-11} & \cdots & b_{N-1n} \\ \vdots & \ddots & \vdots \\ b_{-N+11} & \cdots & b_{-N+1n} \\ b_{-N1} & \cdots & b_{-Nn} \end{bmatrix}}_{B} \cdot \begin{bmatrix} p_1 \\ \vdots \\ p_n \end{bmatrix}, \quad (11)$$

where $p_i^c$ denotes the contact pressure in node i, and $p_j$ denotes the input pressure in zone j. The contact pressure, in turn, is directly related to the removal rate of the CMP process, according to Preston's equation, see F. W. Preston, *The Theory and Design of Plate Glass Polishing Machines*, J. Soc. Glass Technology, Vol. 11, pp. 214-256, 1927:

$$\frac{dh_i(t)}{dt} = -K_p \cdot p_i^c \cdot v_i^r, \quad i = -N \ldots N, \quad (12)$$

where $v_i^r$ is the relative velocity between wafer and pad at node i, and $K_p$ is called Preston's constant. One approach in the herein disclosed invention is to use the columns of the gain matrix B as weight-factors for calculating a weighted average in each zone:

$$h_j^{avg} = [b_{Nj} \ldots b_{-Nj}] \cdot \begin{bmatrix} h(N) \\ \vdots \\ h(-N) \end{bmatrix}, \quad j = 1 \cdots n. \quad (13)$$

One physical interpretation of this way of averaging is that for each zone the measurements that can be most influenced by the pressure actuation are the measurements that receive the strongest weight in the average.

Tracking Error Calculation and Reference Generator (85)

The raw tracking error in each zone is defined as the difference between a reference value coming out of the reference generator 84, and the average as defined by Equation (13):

$$e_j^{raw} = h_j^{ref} - h_j^{avg}, \quad j = 1 \ldots n. \quad (14)$$

There are two modes of control:

1. Absolute thickness control. In this mode, the reference value is an external signal specifying a desired thickness and thickness removal rate, at each point in time. The goal is to make the absolute thickness and polish rate in each zone equal to the corresponding external reference values.

2. Uniformity control. In this mode, the reference value is equal to the measured average thickness in one of the zones, at each point in time. The goal is to control uniformity of the wafer by making the thickness in the other zones equal to the thickness in the reference zone.

After passing through a deadband and a limiter, the tracking error is passed on to the MIMO feedback loop 86.

Multi-Input Multi-Output (MIMO) Feedback Loop (86)

The MIMO Feedback Loop is a truly multivariable controller because the multi-zone pressure system is truly multivariable with multiple pressure actuators, recall FIG. 3, and multiple wafer thickness sensor measurements, recall Equation (13). Because most multivariable feedback control design techniques are based on linear models, linear models must be derived from the dynamic, possibly non-linear, CMP sub-models (see FIG. 2) that describe the linear CMP behavior at a specific operating point (a selection of constant input values). The continuous linear models take on the form:

$$\frac{dx(t)}{dt} = Ax(t) + Bu(t), \quad (15)$$

$$y(t) = Cx(t) + Du(t),$$

where x(t) denotes the vector of state variables, u(t) denotes the vector of input variables (actuators), and y(t) denotes the vector of output variables (sensors), and A, B, C, and D are the state-space matrices of appropriate size. In discrete time, Equation (15) translates to:

$$x(k+1) = Ax(k) + Bu(k), \quad (16)$$

$$y(k) = Cx(k) + Du(k),$$

where k denotes the current (discrete) time sample $t_k = k\Delta T$, while $t_k$ denotes current time at sample k and $\Delta T$ denotes the sampling time of the model of Equation (16), i.e. the time-interval of discretization. For the CMP pressure model, Equations (15) and (16) are formed by Equations (11-13). The thickness at each node on the wafer, $h_i(k)$, i=−N ... N, form the state vector x(k), the pressures $p_j$, j=1 ... n, form the input vector u(k), and the average measured thickness in each zone, $h_j^{avg}$, j=1 ... n, form the output vector y(k).

Based on the linear model of Equation (16), a multivariable feedback controller (or dynamic compensator) is designed that trades off performance versus robustness such as thickness, non-uniformity, tracking, noise filtering, pressure saturation limits, etc. Candidate multivariable linear compensation techniques are Linear Quadratic Gaussian (LQG) control, Quantitative Feedback Theory (QFT), and $H_\infty/\mu$-synthesis. See G. F. Franklin, J. D. Powel, A. Emami-Naeini, *Feedback Control of Dynamic Systems*, 4$^{th}$ edition, Prentice Hall, 2002; D. de Roover, *Motion Control of a Wafer Stage—A Design Approach for Speeding Up IC Production*, Ph.D. Dissertation, Mech. Eng. Systems and Control Group, Delft Univ. of Technology, The Netherlands, 1997; J. H. Vincent, A. Emami-Naeini, N. M. Khraishi, *Case Study Comparison Linear Quadratic Regulator and $H_\infty$ Control Synthesis*, J. Dynamics and Control, Vol. 17, No. 5, pp. 958-965, September-October 1994; Zhou, K., J. C. Doyle, *Essentials of Robust Control*, Prentice-Hall, 1998; and J. M. Maciejowski, *Multivariable Feedback Design*, Addison-Wesley, 1989.

For CMP, compensators can be designed with different techniques. The design technique used is not key to the invention, as long as the final compensator does its job of tracking, noise filtering, disturbance compensation, etc. The final MIMO feedback controller is a critical part of the invention though. To the inventors' best knowledge, this type of feedback control using in-situ sensors is unprecedented anywhere in CMP applications. The final compensator has a state-space form similar to that of Equation (16):

$$x_c(k+1) = A_c x_c(k) + B_c u_c(k),$$

$$y_c(k) = C_c x_c(k) + D_c u_c(k), \quad (17)$$

where the subscript c is indicating the fact that these are all controller state variables, inputs, and outputs. Note that the controller inputs are typically the CMP model outputs, and the controller outputs are the inputs to the CMP model, see FIGS. 2 and 4.

One important advantage of using feedback control based on in-situ sensing is the fact that the controller controls the non-uniformity during the run, i.e. the quality of each single wafer is maximized. Another advantage of feedback control is the fact that the feedback controller can be used to accommodate disturbances such as process noise and/or drift of machine parameters.

Gain Estimation Model (81)

Based on Equation (12), the gain of the system from pressures to removal rate is determined by the values of relative velocity and Preston's constant for the particular process at hand. As mentioned above, the MIMO feedback compensator is designed for linear models in a given operating point of the system. If the operating point changes significantly, the gain of the system may change significantly. Typically, this results in loss of control performance and can lead to instability of the control loop. To make the controller more robust, a Gain Estimation Model 81 (see FIG. 8) was added to the controller that estimates the gain from the measured thickness data in real-time. If the thickness at each point in time is stored in memory, it is straightforward to estimate the removal rate of the system at each point in time by taking the difference of the currently measured thickness and the previously measured thickness. This gives the left-hand of Equation (12). A nominal linear model was derived based on nominal values for the right-hand of Equation (12). The ratio of these two thus gives an estimate of the gain of the-system. This estimate is used to adjust the control variables in the MIMO Feedback Loop up or down, dependent on whether the gain is larger than unity or smaller than unity, respectively. This gain estimate is therefore model-based and it does feed into the MIMO Feedback Loop, see FIG. 8.

The final output of the Pressure Profile Control Module comes out of a switch 82, see FIG. 8:

If the controller is used in an Open-loop (OL) manner, the measured input pressures coming from a host system are passed on directly to the output and the controller is not being used.

If the controller is used in a Closed-loop (CL) manner, the pressure output is composed of the offset values, $p_{offs}(t)$, coming out of the Temperature Control Module (feedforward values in nominal pressure set point) and the feedback values coming out of the MIMO Feedback Loop, $p_{fb}(t)$.

Slurry Flow Control Module (44)

The Slurry Flow Control Module 44 controls the slurry flow to the system, see FIG. 4. It takes the offset value from the Slurry Flow Slave Loop 55, which comes out of the Temperature Control Module 41, see FIG. 5, and computes the slurry flow set point for the system. Currently, the Slurry Flow Control Module is designed such that slurry flow control relieves the pressure control in trying to control process temperature. In other embodiments, the Slurry Flow Control Module may be enhanced by incorporating a slurry transport model 24, as shown in FIG. 2, that determines how slurry flow affects the distributed removal rate. This information is used to control slurry flow such that wafer profile uniformity is enhanced, in addition to controlling wafer profile uniformity through temperature and pressure control.

Motor Velocity Control Module (43)

The Motor Velocity Control Module 43 controls the motor velocity of both the wafer spindle (carrier or head) and the platen (or pad), see FIG. 4. It takes the offset value from the Velocity Slave Loop 56, which comes out of the Temperature Control Module, see FIG. 5, and computes the velocity set points for the DC motors. Currently, the Motor Velocity Module is designed such that motor velocity control relieves the pressure control and slurry flow control in trying to control process temperature. In other embodiments, the Motor Velocity Control Module is enhanced by incorporating a kinematic model 20, as shown in FIG. 2, that determines how motor velocity affects the distributed removal rate. This information is used to control wafer and pad motor velocities such that wafer profile uniformity is enhanced in addition to controlling wafer profile uniformity through temperature and pressure control.

For example, kinematic analysis for a rotational CMP system yields the following expression for relative speed between a point on the wafer and the pad. See, also, B. U. Yoon, R. P. Young, K. J. In, L. S. Chan, Y. L. Moon, *The Effects of Platen and Carrier Rotational Speeds on Within Wafer Non-Uniformity of CMP Removal Rate*, 1998 CMP-MIC Conference, IMIC—300P/98/0193, Feb. 19-20, 1998; and D-Z. Chen, B-S. Lee, *Pattern Planarization Model of Chemical Mechanical Polishing*, J. of the Electrochemical Society, 146(2), 744-748, 1999:

$$v_{rel}(r_w, t) = \sqrt{r_o^2 \omega_p^2 + r_w^2(\omega_w - \omega_p)^2 + 2r_o r_w \omega_p(\omega_p - \omega_w)\cos\omega_w t}, \quad (18)$$

with $r_o$ the distance between the centers of the pad and the wafer, $\omega_p$ and $\omega_w$ the rotational speeds of the platen and wafer, respectively, and $r_w$ the distance of a point on the wafer from the wafer center. The time-averaged relative speed of a point on the wafer at distance $r_w$ from the wafer center is now obtained by:

$$\bar{v}_{rel}(r_w) = \frac{1}{T_w} \int_0^{T_w} v_{rel}(r_w, t) dt, \quad (19)$$

with $T_w = 2\pi/\omega_w$ the rotational period of the wafer. For given rotational speeds $\omega_p$ and $\omega_w$, and center-to-center distance $r_o$, the time-averaged relative velocity can be computed as a function of wafer radius by solving the integral in Equation (19) numerically. From Equations (12), (18) and (19) it is seen that the removal rate is a function of the rotational speeds of pad and wafer, and that uniform removal rate is obtained if and only if pad and wafer rotational speeds are equal, which is a well known fact in CMP processes. If the rotational speeds are not equal to one another, the removal rate is non-uniform across the wafer in a parabolic shape. The profile uniformity can thus be influenced by independently controlling the platen and wafer velocity, respectively.

It should be noted that the proposed approach is applicable to CMP systems with different kinematic motions as well, e.g. a rotational CMP system with a sweep arm, or a linear CMP system, or an orbital CMP system, etc. In all these cases, Equations (18) and (19) are replaced by their corresponding kinematic equations.

Post-Scaling for Temperature Control (45)

The Post-Scaling for Temperature Control Module 45 performs a scaling of all control variables, i.e. pressures, slurry flow, and motor velocities, in order to maintain tight temperature control. If any of the Modules changes the nominal offset values coming out of the Temperature Control Module, the final process temperature is affected. For example, if the Pressure Profile Control Module decides that it needs to increase or decrease some of the zone pressure to maintain uniformity, the process temperature is increased or decreased, respectively, and thus deviates from the reference temperature as computed in the Temperature Control Module (see FIG. 5). This deviation can be minimized by post-scaling all zone pressures such that the net temperature increase or decrease from the individual zone adjustments is counteracted by total scaling of all pressures. Similarly, other actuation variables can be used for scaling, such as slurry flow rate and motor velocity, see FIG. 4. In this manner both uniformity and temperature are controlled. This explains why the scaling block preferably comes after the individual Control Modules.

CONCLUSION

Herein disclosed is an innovative approach for model-based real-time control of CMP systems. The invention provides a method and apparatus that processes in-situ data from a suite of real-time sensors and produces real-time commands to multiple actuators, such as applied pressures, slurry flow, and wafer/pad velocity. A key aspect of the invention is an integrated model-based pressure-temperature-velocity-slurry flow control system that includes many innovations in real-time mode identification, real-time gain estimation, and real-time control. Detailed and accurate component models of the CMP process enable this kind of advanced complexity. The solution and methodology are generic and readily allow inclusion of all types of sensors.

While the preferred method of control of the invention herein disclosed is in-situ feedback/feedforward control, the invention is not limited to this type of control only. The disclosed invention can be augmented with other types of control, such as run-to-run control, iterative learning control, adaptive control, etc., without departing from the spirit and scope of the present invention.

It should further be noted that the type of models discussed in disclosed invention are not limited to physics-based mathematical models, but can be replaced by empirical mathematical models, or any combination of physics-based and empirical mathematical models (semiempirical models), without departing from the spirit and scope of the present invention.

Although the invention is described herein with reference to the preferred embodiment, one skilled in the art will readily appreciate that other applications may be substituted for those set forth herein without departing from the spirit and scope of the present invention. For example, the invention is readily applicable to CMP machines for use with wafers of any style, e.g. 150 mm, 200 mm, 300 mm, 400 mm, etc. Further, the invention is applicable to applications of CMP that go beyond semiconductor fabrication, and includes manufacturing of read-write heads for hard disks and Micro-Electrical-Mechanical Systems (MEMS) devices. The invention applies to any planarization machine. Secondary applications are traditional precision grinding and polishing which include optics/ceramics industries, glass and metal manufacturers as well as in double-sided memory disk media grinding.

Accordingly, the invention should only be limited by the Claims included below.

The invention claimed is:

1. A real-time in-situ model-based chemical-mechanical planarization (CMP) controller, comprising:

a dynamic mathematical model of a CMP system to be controlled in response to in-situ data from a plurality of real-time sensors in said CMP system, said mathematical model comprising any of a physics-based model and an empirical model;

computer simulation means for evaluating said mathematical model; and means for validating said mathematical model using any of real-time, in-situ data and ex-situ data from said CMP system.

2. The controller of claim 1, further comprising:
a reduced mathematical model for real-time in-situ CMP system control.

3. The controller of claim 1, said mathematical model comprising any of:
a real-time removal rate model of a CMP system; and
a real-time thermal model of a CMP system.

4. The controller of claim 1, wherein modifications of said CMP system can be evaluated with said mathematical model via computer simulation prior to any CMP system modifications.

5. A method for producing a real-time in-situ model-based chemical-mechanical planarization (CMP) controller, comprising the steps of:
generating a dynamic mathematical model of a CMP system to be controlled in response to in-situ data from a plurality of real-time sensors in said CMP system said mathematical model comprising any of a physics-based model and an empirical model;

evaluating said mathematical model with a computer simulation; and validating said mathematical model using any of real-time in-situ data and ex-situ data from said CMP system.

6. The method of claim 5, further comprising the step of:
controlling said CMP system in real-time with a reduced mathematical model.

7. The method of claim 6, said mathematical model comprising any of:
a real-time removal rate model of a CMP system; and
a real-time thermal model of a CMP system.

8. The method of claim 6, further comprising the step of:
evaluating said CMP system with said mathematical model via computer simulation prior to any CMP system modifications.

9. In a model-based chemical-mechanical planarization (CMP) controller, said model comprising: a dynamic mathematical model of a CMP system to be controlled in real-time, said mathematical model comprising any of a physics-based model, an empirical model, and any combination thereof, said mathematical model produced by open-loop and closed-loop techniques comprising use of both a computer simulation means for evaluating said mathematical model and means for validating said mathematical model using any of real-time, in-situ data and ex-situ data from said CMP system, said controller; and a reduced mathematical model for CMP system control in response to in-situ data from a plurality of real-time sensors in said CMP system.

* * * * *